United States Patent [19]
Hirano et al.

[11] Patent Number: 6,113,018
[45] Date of Patent: *Sep. 5, 2000

[54] REVERSAL PREVENTIVE DEVICE

[75] Inventors: Kazuo Hirano; Eiji Shinohara; Takashi Higashimoto, all of Tokyo, Japan

[73] Assignee: Daiwa Seiko, Inc., Tokyo, Japan

[*] Notice: This patent is subject to a terminal disclaimer.

[21] Appl. No.: 09/326,592

[22] Filed: Jun. 7, 1999

Related U.S. Application Data

[63] Continuation of application No. 08/954,104, Oct. 20, 1997, Pat. No. 5,918,825, which is a continuation of application No. 08/677,731, Jul. 8, 1996, Pat. No. 5,678,781, which is a division of application No. 08/557,820, Nov. 14, 1995, Pat. No. 5,662,286, which is a continuation of application No. 08/434,795, May 4, 1995, Pat. No. 5,494,232, which is a continuation of application No. 08/073,925, Jun. 9, 1993, abandoned.

[30] Foreign Application Priority Data

| Jun. 11, 1992 | [JP] | Japan | 4-176001 |
| Aug. 5, 1992 | [JP] | Japan | 4-227791 |
| Dec. 10, 1992 | [JP] | Japan | 4-352169 |

[51] Int. Cl.$^7$ .................. A01K 89/02; F16D 66/00
[52] U.S. Cl. .................. 242/247; 242/299; 188/82.3; 192/44
[58] Field of Search .................. 242/247, 298, 242/299; 188/82.1, 82.3; 192/44

[56] References Cited

U.S. PATENT DOCUMENTS

| 1,718,359 | 6/1929 | Joseph | 192/44 |
| 2,410,392 | 10/1946 | Rich | 192/44 |
| 3,054,488 | 9/1962 | General et al. | 192/44 |
| 3,476,226 | 11/1969 | Massey | 192/44 |
| 3,510,083 | 5/1970 | Cook | 242/295 |
| 3,757,904 | 9/1973 | Deyoung | 188/82.3 |
| 4,515,325 | 5/1985 | Ito | 242/295 |
| 4,597,467 | 7/1986 | Stockton | 192/44 X |
| 4,712,661 | 12/1987 | Lederman et al. | 192/44 X |
| 4,987,803 | 1/1991 | Chern | 192/44 X |
| 5,020,738 | 6/1991 | Yamaguchi | 242/247 X |
| 5,145,125 | 9/1992 | Morimoto | 242/268 |
| 5,152,726 | 10/1992 | Lederman | 188/82.3 X |
| 5,372,323 | 12/1994 | Hirano et al. | 242/247 |
| 5,494,232 | 2/1996 | Hirano et al. | 242/247 |
| 5,662,286 | 9/1997 | Hirano | 242/247 |
| 5,678,781 | 10/1997 | Hirano et al. | 242/247 |
| 5,918,825 | 7/1999 | Hirano et al. | 242/247 |

FOREIGN PATENT DOCUMENTS

0 440 231  8/1991  European Pat. Off. .

*Primary Examiner*—Michael R. Mansen
*Attorney, Agent, or Firm*—Liniak, Berenato, Longacre & White

[57] ABSTRACT

A rolling member fitted into a guide recess and capable of performing a wedge action on a collar of a rotary quill is held by an annular holder in such a manner that the longitudinal movement of the rolling member can be restricted and the outside of the annular holder is rotatably fitted with an annular outer frame for restricting the outward movement of the rolling member, thereby forming a clutch main body. By rotating the annular holder by use of a rotation operation member provided in the annular holder, the rolling member is controlled such that it can be restricted and held at an operative position allowing the wedge action or at a non-operative position prohibiting the wedge action, thereby switching the rotary quill to a reversal preventive position or to a reversal allowable position. Also, the clutch main body is constructed as detachable one unit.

12 Claims, 12 Drawing Sheets

REVERSAL PREVENTIVE DEVICE

This application is a continuation of prior application Ser. No. 08/954,104, filed Oct. 20, 1997, now U.S. Pat. No. 5,918,825, which is a continuation of Ser. No. 08/677,731, filed Jul. 8, 1996, now U.S. Pat. No. 5,678,781, which is a divisional of Ser. No. 08/557,820, filed Nov. 14, 1995, now U.S. Pat. No. 5,662,286, which is a continuation of Ser. No. 08/434,795, filed May 4, 1995, now U.S. Pat. No. 5,494,232, which is a continuation of Ser. No. 08/073,925 filed Jun. 9, 1993, now abandoned.

BACKGROUND OF THE INVENTION

The present invention relates to a reversal preventive device for preventing the reversed rotation of a rotary shaft and, in particular, to an improved reversal preventive device applicable to a fishing reel, capable of switching a rotary shaft from its reversal preventive state to its reversal allowable state or vice versa.

Japanese Patent Publication No. 54-141285 of Showa discloses a reversed rotation preventive device for preventing the reversed rotation of a rotary shaft by use of the wedge action of a rolling member. The reversed rotation preventive device can switch the rotary shaft of the rotor from its reversal preventive state to its reversal allowable state or vice versa according to fishing conditions.

The reversed rotation preventive device has a holder member for circumferentially supporting therein a rolling member in such a manner that the rolling member can perform a wedge action in cooperation therewith, and a switch member for holding the rolling member axially so as to prevent the removal of the rolling member from the holder member and for restricting the rolling member to its operative position allowing its wedge action or at its non-operative position prohibiting its wedge action. The switch member is mounted on an axial end of the holder member by utilizing mounting screws which is commonly used for mounting the entire rotation preventive device onto the reel casing. Therefore, the rolling member, hold member and switch member separately from one another must be assembled to the reel casing. Also, when the rotation preventive device is disassembled from the reel casing for cleaning purpose, the rolling member, holder member and switch member are unavoidably separated from one another. Therefore, the conventional rotation preventive device comprised of separate rolling member, holder member and switch member are inconvenient to handle. Further, the supporting of the rolling member by the switch member is not stable from the viewpoint of dimensional accuracy and supporting strength, and thus a smooth and positive wedge action cannot be maintained.

Accordingly, it is an object of the invention to provide a reversal preventive device which can solve the above-mentioned problems found in the conventional reversal preventive mechanism utilizing a wedge action of a rolling member.

SUMMARY OF THE INVENTION

In order to attain the above-note and other objects, the present invention provides a reverse rotation preventive device for selectively preventing a reversed rotation of a first member rotatably supported on a second member, which is made up of a clutch unit adapted to be mounted between the first and second members and removable therefrom as a unit construction. The clutch unit includes: a rolling member; a annular holder formed with a guide recess for accommodating and supporting the rolling member so as to restrict an axial displacement of the rolling member; first positioning means for biasing the rolling member toward a first position where the rolling member is permitted to perform a wedge action on the first member wherein the first member is permitted to rotated in a first direction and prevented from rotating in a second direction opposite to the first direction; and second positioning means for moving the rolling member, against a biasing force of the first positioning means, toward a second position where the rolling member is prevented from performing the wedge action wherein the first member is permitted to rotate in both the directions.

The annular holder may be designed to be non-rotatably mounted onto the second member so that the rolling member in the first position performs the wedge action between the first member and the annular holder. Alternatively, the clutch unit may have an annular outer frame coupled to the annular holder and adapted to be non-rotatably mounted onto the second member so that the rolling member in the first position performs the wedge action between the first member and the annular outer frame.

Preferably, the first positioning means also functions to retain the rolling member in the guide recess.

The annular holder is non-rotatably coupled to the annular outer frame. Alternatively, the annular holder may be rotatably coupled to the annular outer frame. In the latter case, the second positioning means is fixed to the annular holder so that the annular holder is rotated relative to the annular outer frame to move the rolling member toward the second position.

DETAILED DESCRIPTION OF THE INVENTION

Preferred embodiments of the present invention will now be described hereinafter with reference to the drawings attached hereto.

Figure 1:
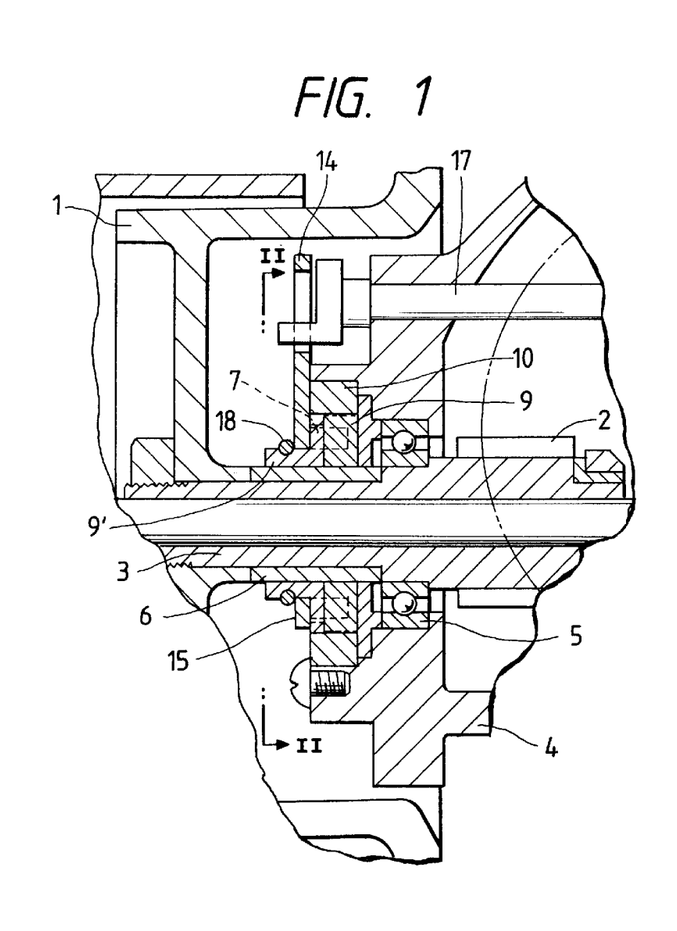
FIG. 1 is a longitudinally sectional front view of a first embodiment according to the invention.
Figure 2:
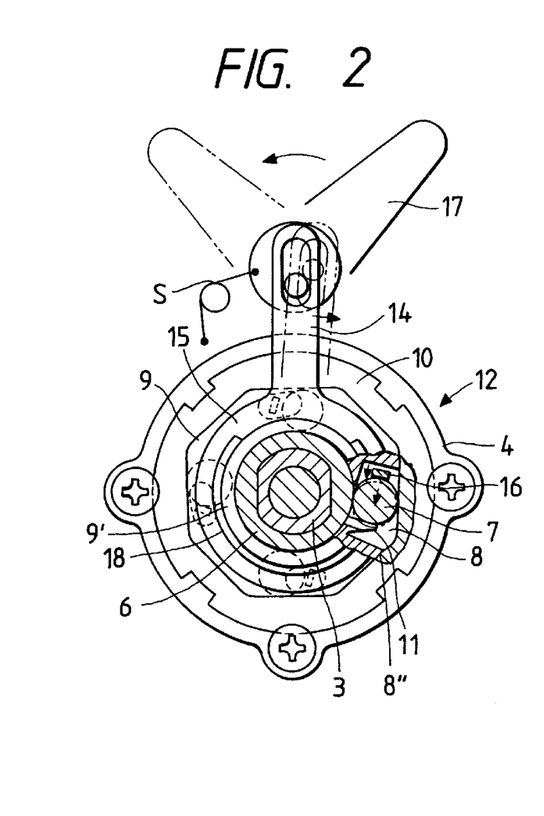
FIG. 2 is a partially cutaway section view of the first embodiment, taken along the line (A—A) in FIG. 1.
Figure 3:
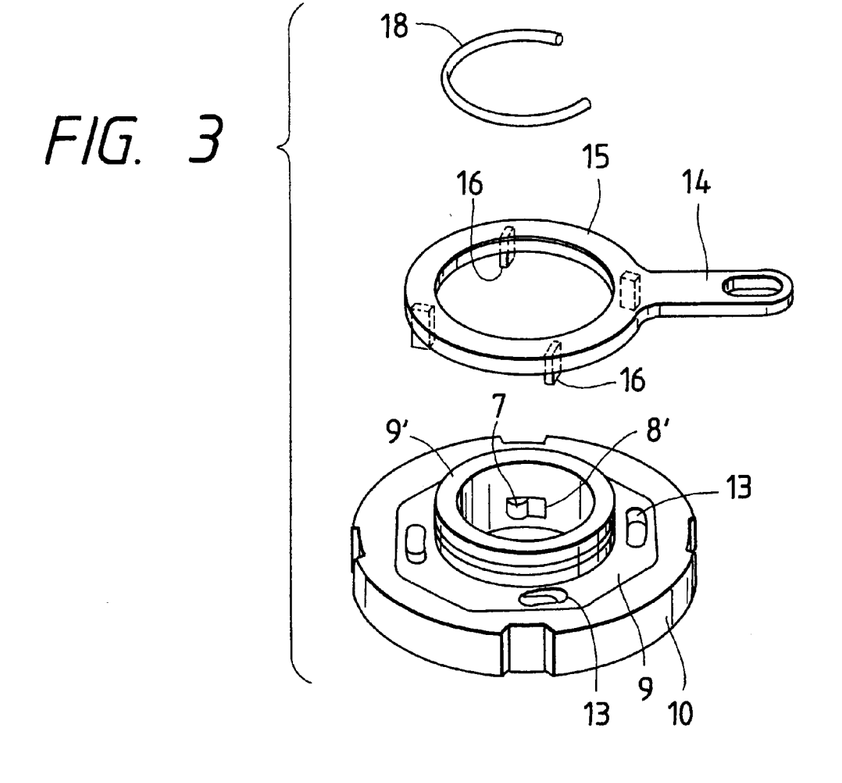
FIG. 3 is an exploded perspective view of main portions of the first embodiment of the invention.

FIGS. 1–3 show a reversed rotation preventive device applied to a spinning reel for fishing, which constitutes a first embodiment of the present invention. In the spinning reel, as well-known, a rotor 1 is fixedly secured to a rotary quill 3 which is formed with a pinion 2 meshable with a drive gear mounted on a handle shaft. The rotary quill 3 is rotatably supported by a front portion of a reel casing 4 by means of a bearing 5, and a collar 6 is non-rotatably fitted onto a portion of the rotary quill 3 in front of the bearing 5.

The reversed rotation preventive device according to the first embodiment of the present invention includes a clutch unit 12 which is constructed mainly by an annular holder 9 adapted to be rotatably mounted onto the rotary quill 3 through the collar 6, an annular outer frame 10 non-rotatably and tightly fitted onto the annular holder 9, and rolling members 7 held by the annular holder 9 and the annular outer frame 10. The annular holder 9 is formed with guide recesses 8 for accommodating respective rolling members 7 therein. Each guide recess 8 has an opening 8' at the bottom thereof, through which the rolling member 7 accommodated in the guide recess 8 is partially exposed so as to contact with the collar 6 and an opposite open end 8" through which the rolling member 7 is permitted to contact with the inner surface of the annular outer frame 10 for wedge action.

A spring 11 is provided in each guide recess 8 for biasing the rolling member 7 in an reversal preventive position where the rolling member 7 can perform a wedge action between outer circumference of the collar 6 and the inner surface of the annular outer frame 10. In the reversal preventive position, the rotation of the rotary quill 3 is permitted when the rotary quill 3 is rotated in a direction where the rotor 3 winds a fishing line onto a spool. On the other hand, if the rotary quill 3 is going to rotate reversely, then the wedge action of the rolling member 7 prevents the rotary quill 3 from rotating.

In order to prevent the rolling members 7 from falling off from the clutch unit 12 during the assembling or disassembling operation, the guide recesses 8 are configurated as follows: The opening 8' has such a dimension as to permit the rolling member 7 to be circumferentially moved relative to the annular holder 9 within the guide recess 8 while contacting the collar 6 and to prevent the rolling member 7 from falling off from the guide recess 8 through the opening 8'. The open end 8" has such a dimension as to permit the insertion of the rolling member 7 into the guide recess 8. Therefore, the axial and radially-inward motions of the rolling member 7 accommodated in the guide recess 8 are restricted by the annular holder 9 and the radially-outward motions thereof is restricted by the annular outer frame member 10 so as to prevent the rolling member 7 from falling off from the clutch unit 12.

Alternatively, in order to prevent the rolling members 7 from falling off from the clutch unit 12, the spring 11 may be arranged to bias the rolling member obliquely outward to retain the rolling member 7 in the guide recess 8.

Arc-shaped holes 13 are formed in the annular holder 9 so as to passes through the front portion of the annular hold 9 and communicate with respective guide recesses 8 accommodating the rolling members 7. An annular switch member 15 having an operation rod 14 is rotatably fitted onto a shaft cylinder portion 9' which projects on and from the front portion of the annular holder 9. The switch member 15 includes operation projection pieces 16 which are inserted into respective arc-shaped holes 13 so as to be abuttable against the rolling members 7. With the rotation of the operation rod 14 relative to the holder 9, each rolling member 7 can be held at its operative position, i.e. the reversal preventive position, which allows the rolling member 7 to perform the wedge action or at its non-operative position which prevents the rolling member 7 from performing the wedge action.

In the drawings, reference character 17 designates an operation member rotatably mounted on the reel casing for rotating the operation rod 14, and 18 designates a retaining ring for retaining the switch member 15 fitted to the shaft cylinder portion 9' in place. Reference character S designates a biasing spring which selectively hold the switch member 14 through the operation member 17 at one of the operative position allowing the wedge action and the non-operative position prohibiting the wedge action, utilizing its dead point action.

In a state where the switch member 15 is held at the operative position with the operation rod 14 so that the rolling member 7 is allowed to perform the wedge action, the rotary quill 3 can be rotated to rotate the rotor 1 in the fishing line winding direction while the reversed rotation thereof is prevented by the wedge action of the rolling member 7. On the other hand, in a state where the switch member 15 is rotated so that the operation projection piece 16 moves the rolling member 7 against the biasing force of the spring 11 in the arrow-marked direction shown in FIG. 2 and holds the rolling member 7 at the non-operative position prohibiting the wedge action, the rotary quill 3 is free to rotate forwardly and reversely and the fishing line can, thus, be reeled out by means of the tension of the fishing line itself.

In this structure, the rolling members 7, hold member 9, outer frame 10 and switch member 15 are combined together in the compact clutch unit 12 and, therefore, the reversal preventive device of the present invention is easy to assemble to the rotary quill 3 and is also easy to disconnect therefrom for cleaning. Further, according to the present invention, the support operation for the rolling member 7 can be stabilized to thereby realize a smooth and positive wedge action.

Figure 4:
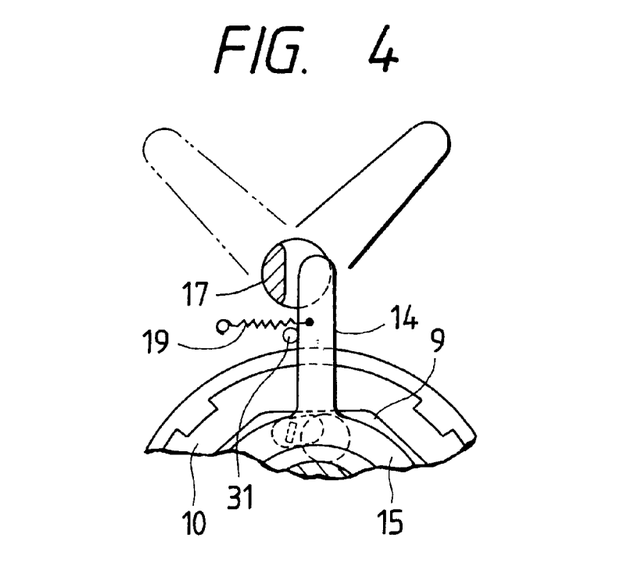
FIG. 4 is a side view showing a modification of the first embodiment.

FIG. 4 shows a modified one of the first embodiment of the present invention, in which the switch member 15 is biased by a spring 19 to hold the rolling member at the operative position. A stop pin 31 is provided to position the switch member 15 in place. An operation knob 17 having a semi-cylindrical cam projection rotates the switch member 15 against the biasing force of the spring 19 to position the rolling member in the non-operative position.

Figure 5:
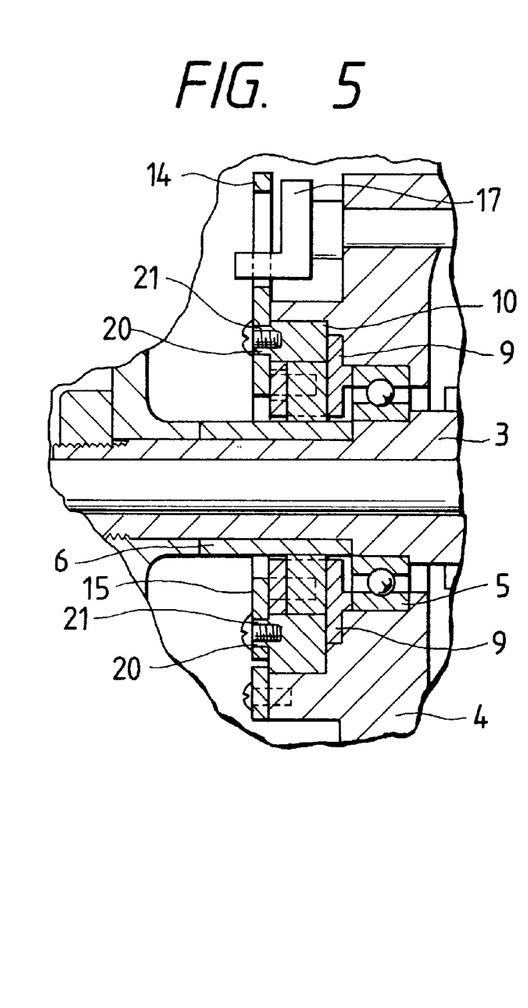
FIG. 5 is a longitudinal front view showing another modification of the first embodiment.

FIG. 5 shows another modified one of the first embodiment, in which arc-shaped elongated holes 20 are formed in the switch member 15, with the arc-shaped elongated holes 20 fitted with respective pins 21 projectingly provided on the outer frame 10 so that the switch member 15 is rotatably mounted on the outer frame 10. The shaft cylindrical portion 9' and the retaining ring 18 in the first embodiment can be dispensed with.

Figure 6:
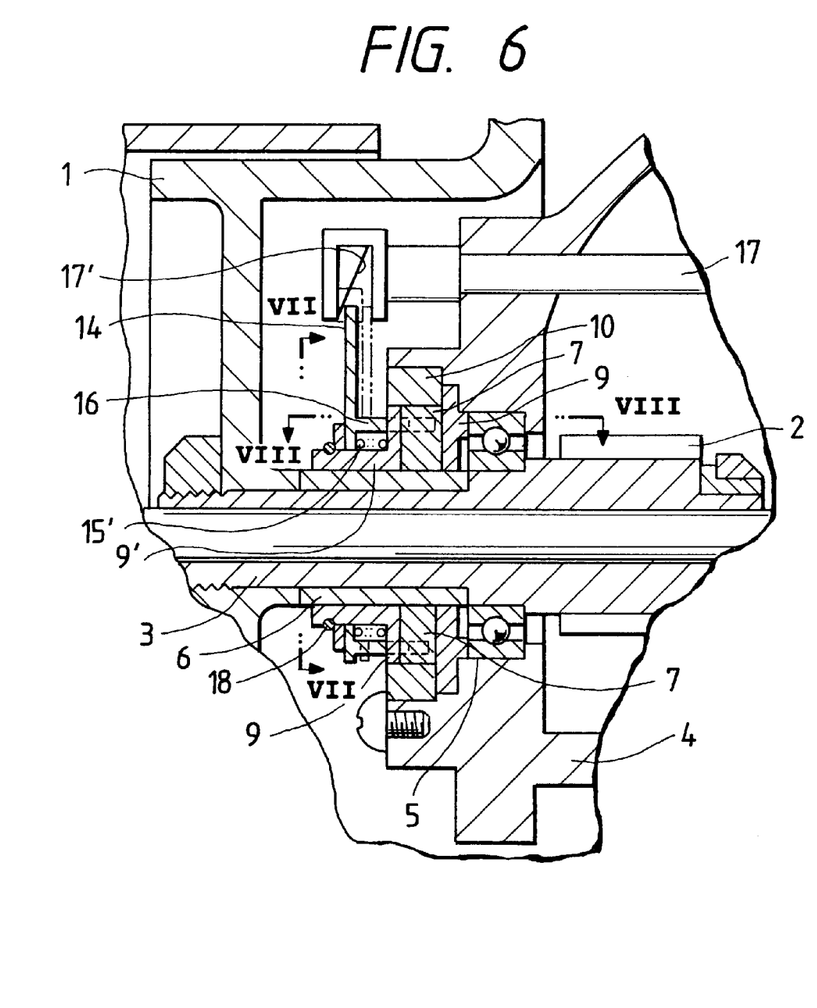
FIG. 6 is a longitudinal front view showing yet another modification of the first embodiment.
Figure 7:
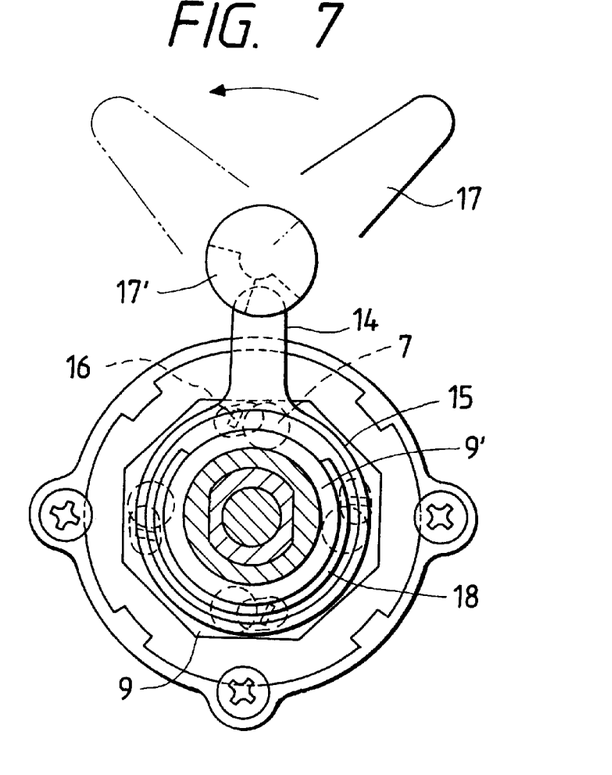
FIG. 7 is a section view taken along the line (B—B) in FIG. 6.
Figure 8:
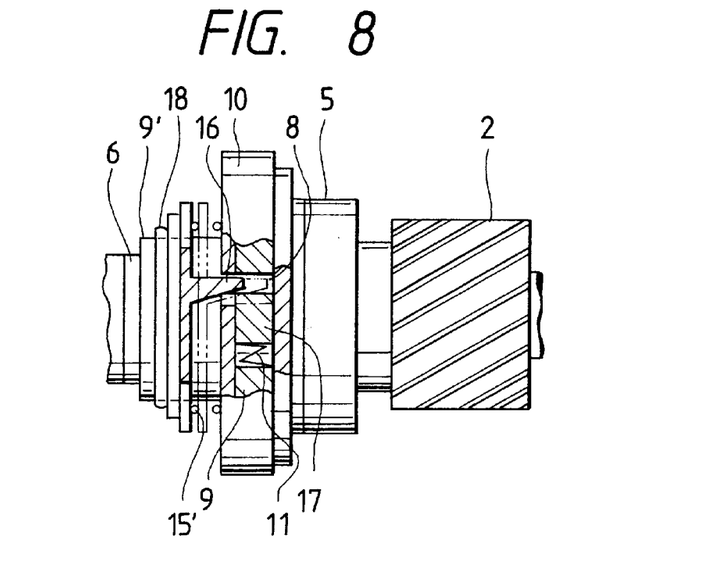
FIG. 8 is a partially cutaway section view taken along the line (C—C) in FIG. 6.

FIGS. 6 and 8 show yet another modification of the reversal preventive device according to the first embodiment of the present invention. The switch member 15 is fitted onto the shaft cylinder portion 9' of the annular holder 9 so as to be axially movable relative to the annular holder 9. The operation projection piece 16 of the switch member 15 is formed into a tapered shape as best shown in FIG. 8. The switch member 15 is biased by a spring 15' in such a direction where the operation projection piece 16 is prevented from entering the guide recess 8. The upper end of the operation rod 14 of the switch member 15 is brought into contact with the cam surface 17' of the operation member 17. Therefore, if the operation member 17 is rotated, then the switch member 15 is driven by the cam surface 17' through the operation rod 14 to slide against the biasing force of the spring 15', so that the rolling member 7 can be switched and restricted to the non-operative position by means of the tapered operation projection piece 16.

Figure 9:
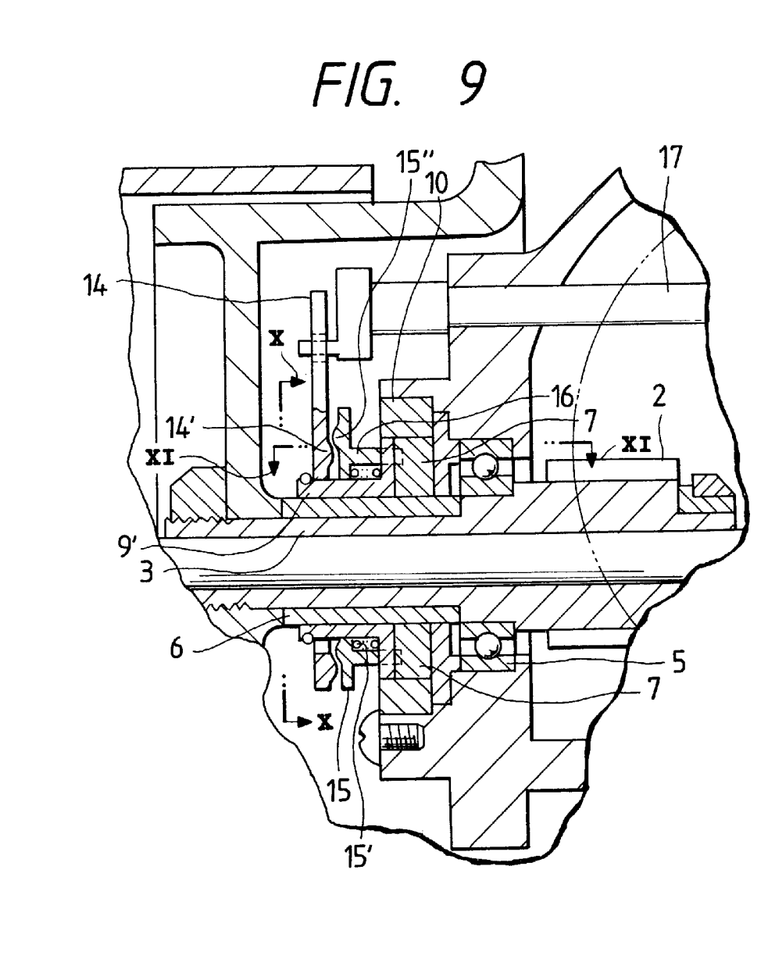
FIG. 9 is a longitudinal front view showing still another modification of the first embodiment.
Figure 10:
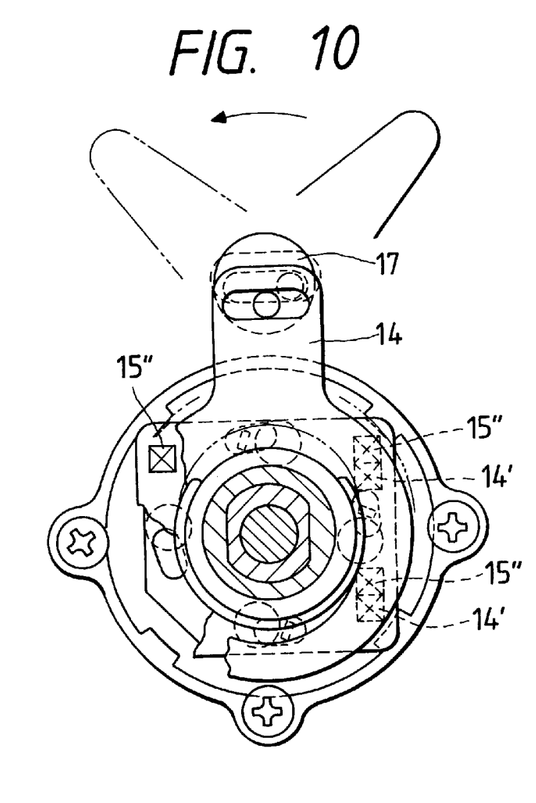
FIG. 10 is a section view taken along the line (D—D) in FIG. 9.
Figure 11:
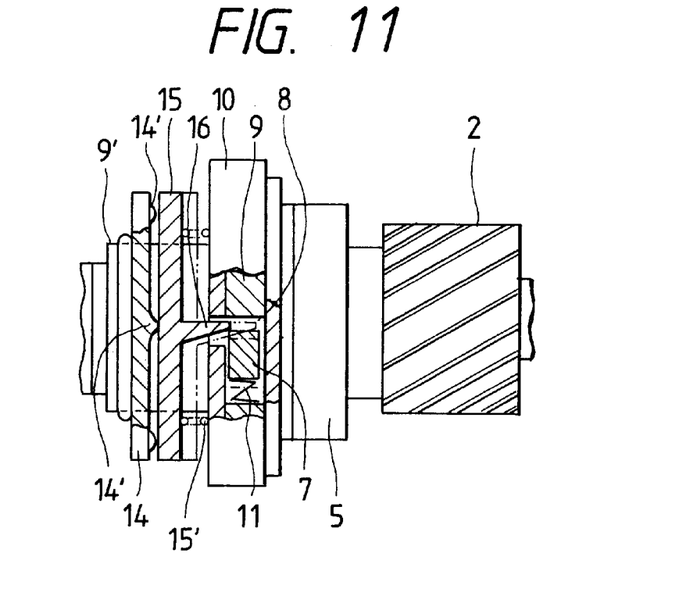
FIG. 11 is a partially cutaway section view taken along the line (E—E) in FIG. 9.

FIGS. 9 and 11 show a further modification of the first embodiment, in which the operation rod 14 is formed separately from the axially movable switch member 15. The operation rod 14 is fitted onto the shaft cylinder portion 9' in such a manner that the operation rod 14 is piled on the switch member 15 and movable vertically relative to the switch member 15. An operation projection 14' is provided on the side surface of the operation rod 14 so as to be engageable with an engagement projection 15" formed on the switch member 15. The upper end of the operation rod 14 is engaged with an operation member 17. When the operation member 17 is rotated to move the operation rod 14 upwardly, the operation projection 14' is brought into abutment with the engagement projection 15" to depress and move the switch member 15 against the biasing force of the spring 15', so that the rolling member 7 can be switched and restricted to the non-operative position by the tapered operation projection 16.

In the above-mentioned first embodiment, the reversal preventive device of the invention is disposed on the rotary quill having a pinion of a spinning reel for fishing. However, the present invention should not be restricted thereto or thereby. The reversal preventive device of the invention may be disposed on a handle shaft, or on a drive shaft of a double bearing type reel.

Figure 12:
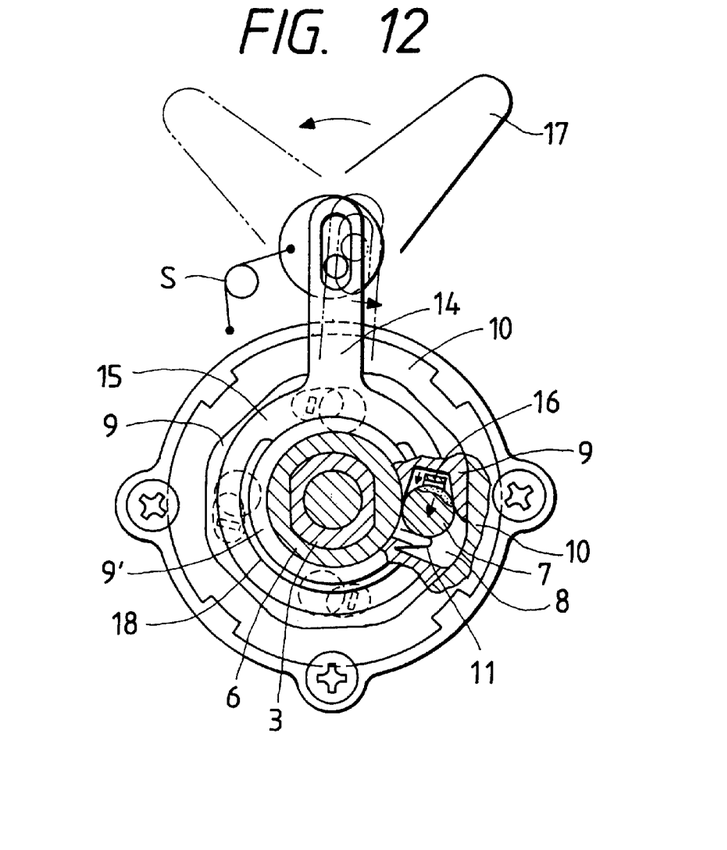
FIG. 12 is a partially cutaway section view corresponding FIG. 2, showing a further modification of the first embodiment.

Further, in the above-mentioned first embodiment, the rolling member 7 in the operative position performs the wedge action between the collar 6 and the inner surface of the annular outer frame 10. However, the present invention should not be restricted thereto or thereby. For example, the reversal preventive device of the present invention can be modified so that the rolling member 7 in the operation position performs the wedge action between the collar 6 and the annular holder 9 as shown in FIG. 12.

Figure 13:
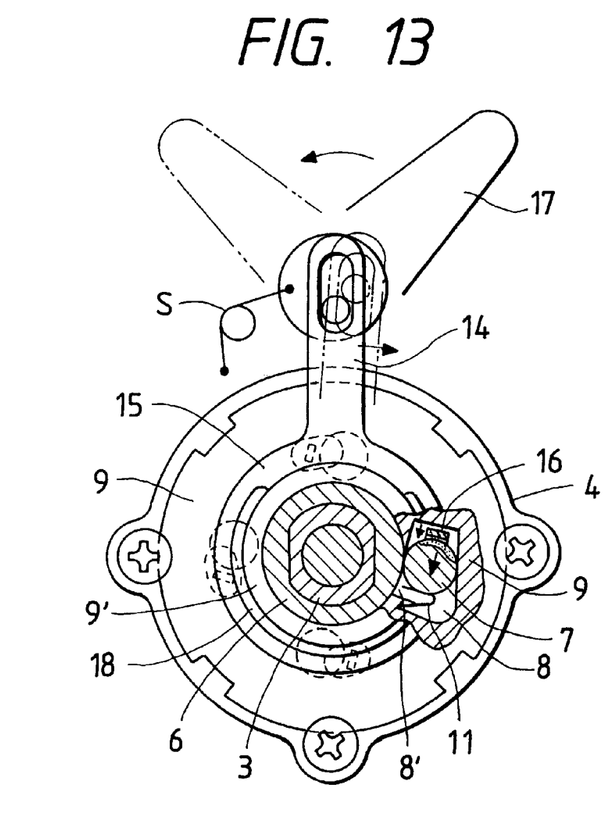
FIG. 13 is a partially cutaway section view corresponding to FIG. 2, showing a still further modification of the first embodiment.
Figure 14:
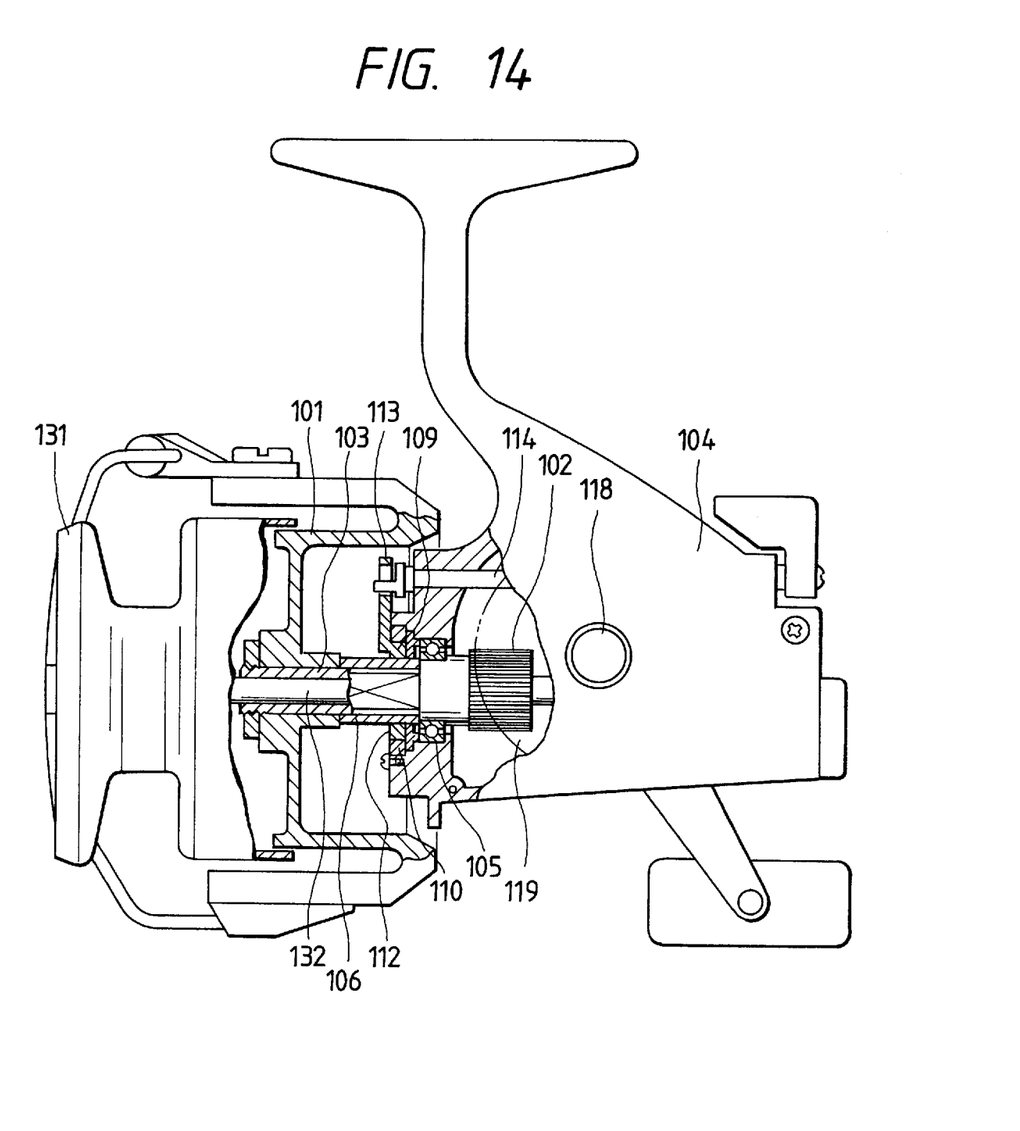
FIG. 14 is a partly cutaway front view of a second embodiment of a reversal preventive device according to the invention.
Figure 15:
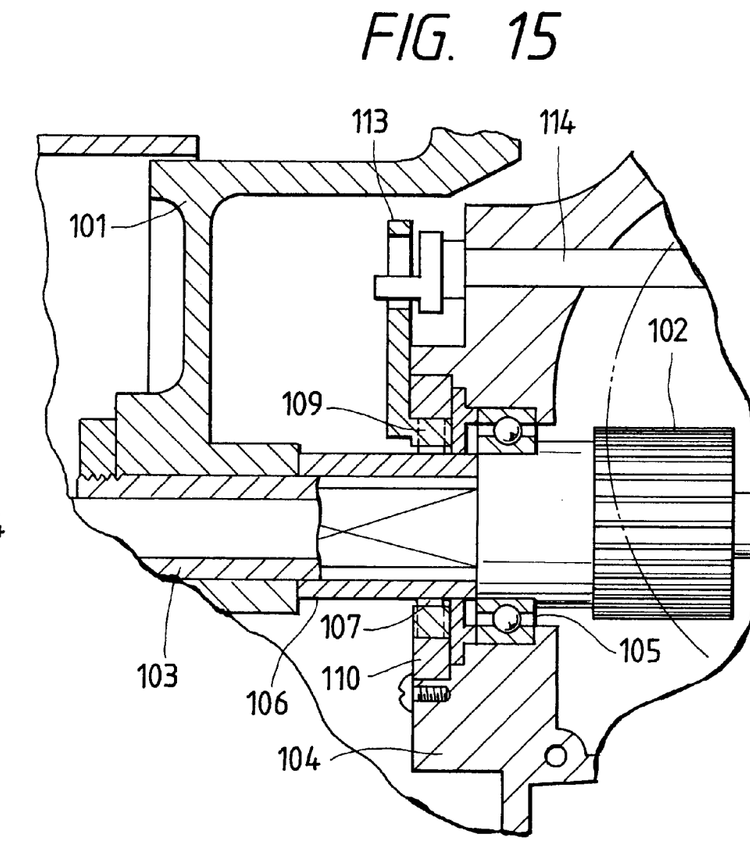
FIG. 15 is a longitudinally sectional front view of main portions of the second embodiment shown in FIG. 14.

Furthermore, the annular outer frame 10 may be dispensed with as shown in FIG. 13. In this case, the guide recess 8 has only one open end 8' through which the rolling member 7 can be inserted into the guide recess 8. The spring 11 biases the rolling member 7 obliquely outward so as to prevent the rolling member 7 from falling off from the clutch unit 12 during the assembling or disassembling operation. The rolling member 7 in the operative position can perform the wedge member 7 in the operative position can perform the wedge action between the collar 6 and a bottom of the guide recess 8.

As has been described heretofore, according to the first embodiment of the invention, an annular holder accommodating and supporting a rolling member capable of performing a wedge action is used to restrict the longitudinal movement of the rolling member, a means for preventing the rolling member from falling off from the annular hold member is provided in or on the annular holder to form a clutch main unit, and a switch member for switching and holding the rolling member at an operative position allowing the wedge action or at a non-operative position prohibiting the wedge action is mounted onto one side portion of the clutch main unit in such a manner that it is rotatable or displaceable axially. Therefore, in this structure, the rolling member, annular hold member, outer frame and switch member are combined integrally into one unit, which makes it quick and easy to assemble the reversal preventive device to the reel in production and to disconnect the device from the reel for cleaning. This structure also stabilizes smooth and secure support operation for selectively providing the wedge action of the rolling member.

Next, a second embodiment of the present invention will be described hereinafter. FIGS. 14–18 show a reversal preventive device used in a spinning reel for fishing. In the spinning reel, as well-known, a rotor 101 is fixedly secured to a rotary quill 103 provided with a pinion 102 meshable with a drive gear 119 mounted on a handle shaft 118. The rotary quill 103 is rotatably supported by the front portion of a reel casing 104 through a bearing 105. A collar 106 is non-rotatably mounted on a portion of the rotary quill 103 in front of the bearing 105. A rotational torque is transmitted from the handle shaft 118 to the rotary quill 103 through the drive gear 119 and the pinion 102 so as to rotate the rotor 101 to wind a fishline onto a spool 131 reciprocally moving together with a spool shaft 132 in conjunction with the handle rotation. The spool shaft 132 passes through the rotary quill 103.

The reversed rotation preventive device according to the second embodiment of the present invention includes a clutch unit 112 which is constructed mainly by an annular holder 109 adapted to be rotatably mounted onto the rotary quill 103 through the collar 106, an annular outer frame 110 adapted to be fixed to the reel casing 104 and rotatably related to the annular holder 109, and rolling members 107 held by the annular holder 109 and the annular outer frame 110. The annular holder 109 has guide recesses 108 for accommodating respective rolling members 107 therein. Each guide recess 108 has an opening 108' at the bottom thereof, through which the rolling member accommodated in the guide recess 108 is partially exposed so as to contact with the collar 106. The guide recess 108 has another opposite open end 108" through which the rolling member 107 is permitted to contact with the inner surface of the annular outer frame 110 for wedge action.

Figure 16:
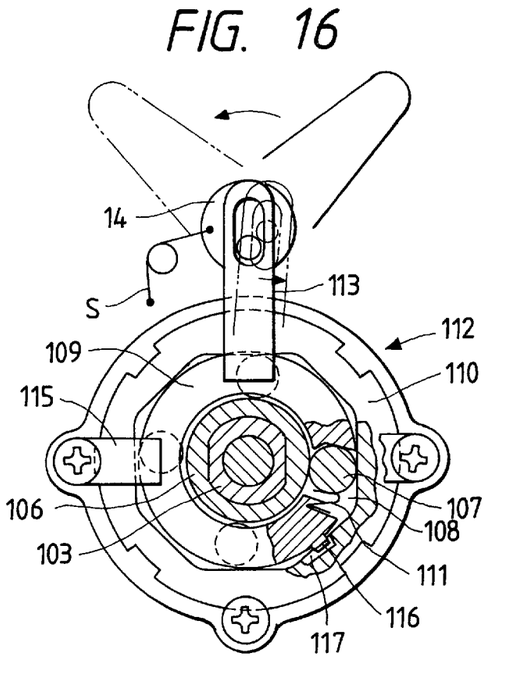
FIG. 16 is a partly cutaway side view of an operative position to be taken by the above main portions.

A spring 111 is provided in the guide recess 8 for biasing the rolling member 7 in a counterclockwise direction in FIG. 16 to permit the rolling member 7 to perform its wedge action on the collar 6.

With the above structure, the rotation of the rotary quill 103 is allowed if the rotary quill 103 is rotated forwardly to rotate the rotor 101 to wind a fishing line onto the spool 131. If the rotary quill 103 is going to rotate in the reversed direction, then the wedge action of the rolling member 107 prevents the reversed rotation of the rotary quill 103 through the collar 106.

Figure 17:
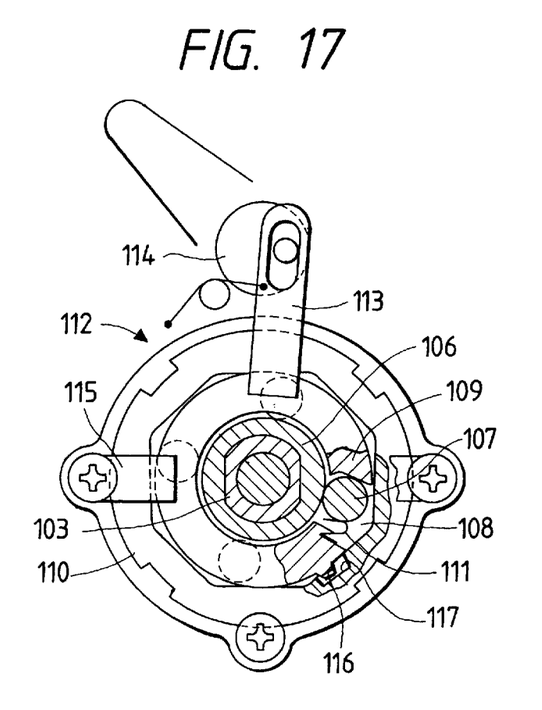
FIG. 17 is a partly cutaway side view of a non-operative position to be taken by the above main portions.
Figure 18:
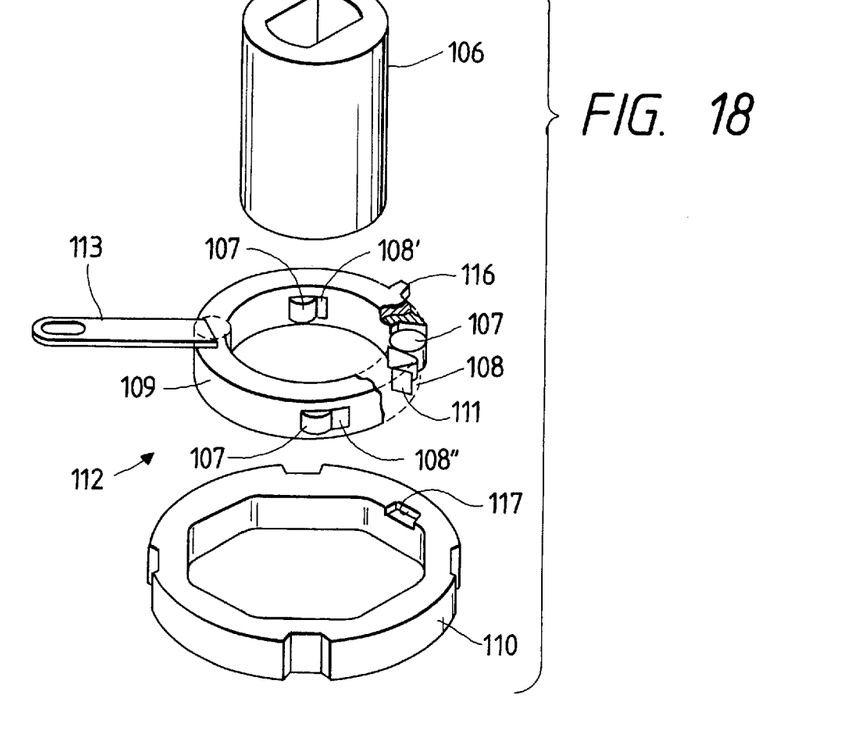
FIG. 18 is an exploded perspective view of the above main portions.

The annular holder 109 has a rotation operation member 113 which is used to rotate the annular holder 109 relative to the annular outer frame 110. The operation member 113 may be integrally formed on the holder 109, or otherwise a separate operation member 113 may be fixed to the holder 109. With the rotation of the operation member 113 through an operation rod 114 supported by the reel casing 104, the annular holder 109 is rotated relative to the annular outer frame 110 to hold and restrict the rolling member 107 to an operative position allowing a wedge action as shown in FIG. 16 or to a non-operative position prohibiting the wedge action as shown in FIG. 17. In the drawings, reference character 115 designates a withdrawal preventive piece which is provided in the annular outer frame 110 so as to prevent the annular holder 109 from being removed from the outer frame 110 in an axial direction, 116 designates a rotation restricting projection which is provided in the annular hold member 109, and 117 designates a fitting recessed portion which is formed to receive the rotation restricting projection 116. Reference character S designates a biasing spring which is used to switch and selectively hold the rotation operation member 113 at one of an operative position allowing the wedge action and a non-operative position prohibiting the wedge action, utilizing its dead point action.

Accordingly, in the state as shown in FIG. 16 in which the annular holder 109 is rotated through the rotation operation member 113 by the operation rod 114 to restrict and hold the rolling member 107 at the operative position allowing the wedge action, the rotary quill 103 can be rotated in the direction to rotate the rotor 101 to wind the fishing line onto the spool, while the reversed rotation of the rotary quill 103 is prevented by the wedge action of the rolling member 107. On the other hand, in the state as shown in FIG. 16 in which the annular holder 109 is rotated by the operation rod 114 to restrict and hold the rolling member 107 at the non-operative position prohibiting the wedge action, the rotary quill 103 is free to rotate both forwardly and reversely and thus the fishing line can also be reeled out due to the tension of the fishing line.

Additionally, in order to prevent the rolling member 107 from falling off from the clutch unit 112 when the clutch unit 112 is assembled to or disassembled from the fishing reel, the spring 111 is also used to retain the rolling member 107 in the guide recess 108. Alternatively, the radially inward open end 118' may have such a dimension as to prevent rolling member 107 from falling off from the guide recess 108 therethrough. Therefore, the axial motion of the rolling member 107 is restricted by the annular holder 109, the radially-inward motion thereof is restricted by the annular holder 109 or the spring 111, and the radially-outward motion thereof is restricted by the annular outer frame member 110.

In the illustrated embodiment, the rolling members 107, annular holder 109 and annular outer frame 110 are compactly combined together as one unit forming the clutch unit 112, which makes it easier to assemble them to the rotary quill 103 as well as to disconnect them from the quill 103 for cleaning. The supporting operation of the rolling member 107 can also be stabilized, which makes it possible for the rolling member 107 to perform its wedge action smoothly and positively.

Figure 19:
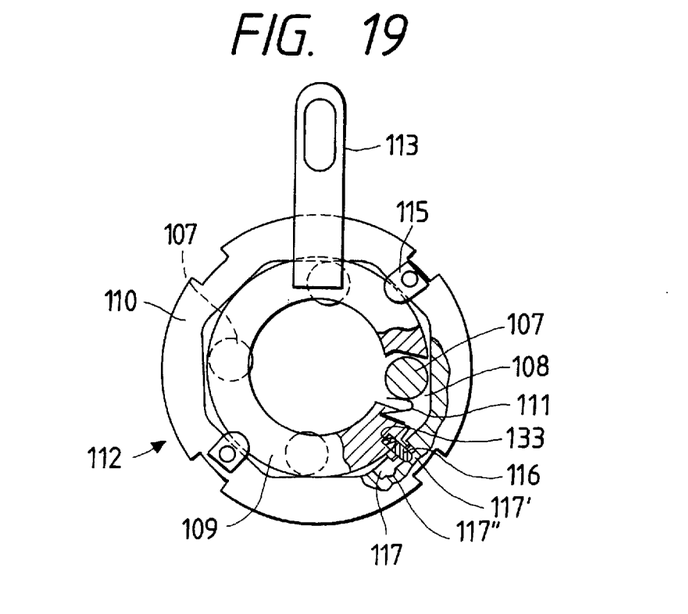
FIG. 19 is a partially cutaway side view showing a modification of the second embodiment.

FIG. 19 shows a modification of the second embodiment, in which the rotation restricting projection 116 employed in the above embodiment is formed in a pin-shaped manner and is biased toward the annular outer frame 110 by a spring 133. Engagement holes 117' and 117" are formed in an inner portion of the outer frame 110 so as to receive the rounded distal end of the projection 116 to selectively and positively hold positively the annular holder 109 at its operative or non-operative position.

Figure 20:
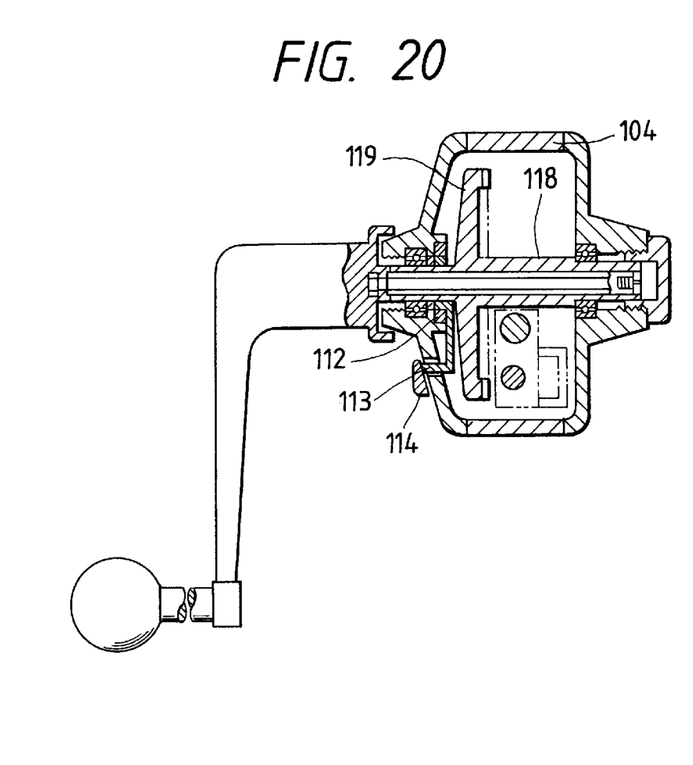
FIG. 20 is a longitudinally sectional front view showing another modification of the second embodiment.

FIG. 20 shows another modification, in which the clutch unit 112 of the present invention is interposed between a drive gear 119 and reel casing 104 in a spinning reel, the drive gear 119 being formed on a handle shaft 118 to rotate together.

Figure 21:
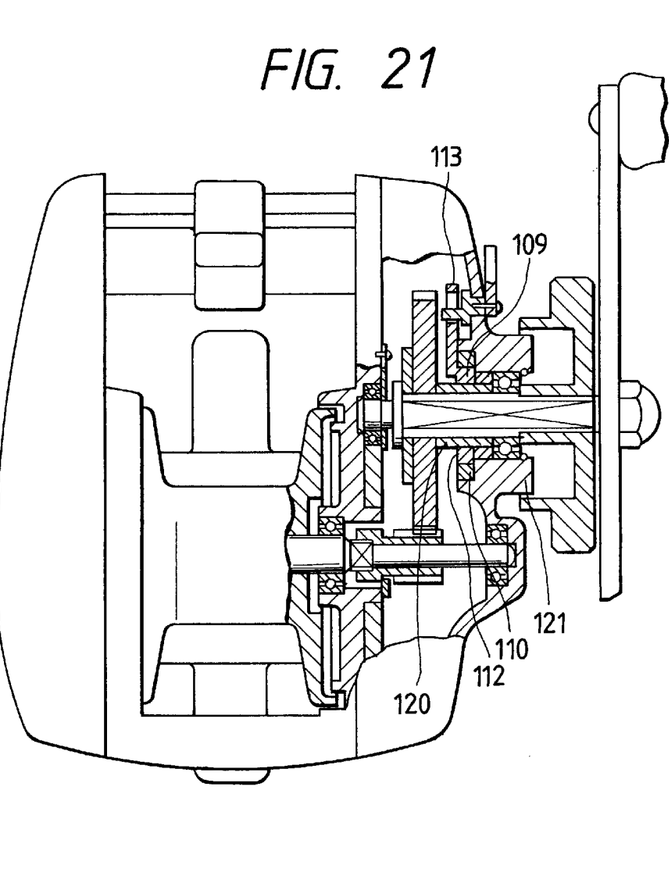
FIG. 21 is a partially cutaway plan view showing yet another modification of the second embodiment.

Further, FIG. 21 shows still another modification, in which the clutch unit 112 of the present invention is interposed between a handle shaft 120 and a reel main body 121 of a double bearing type reel.

Figure 22:
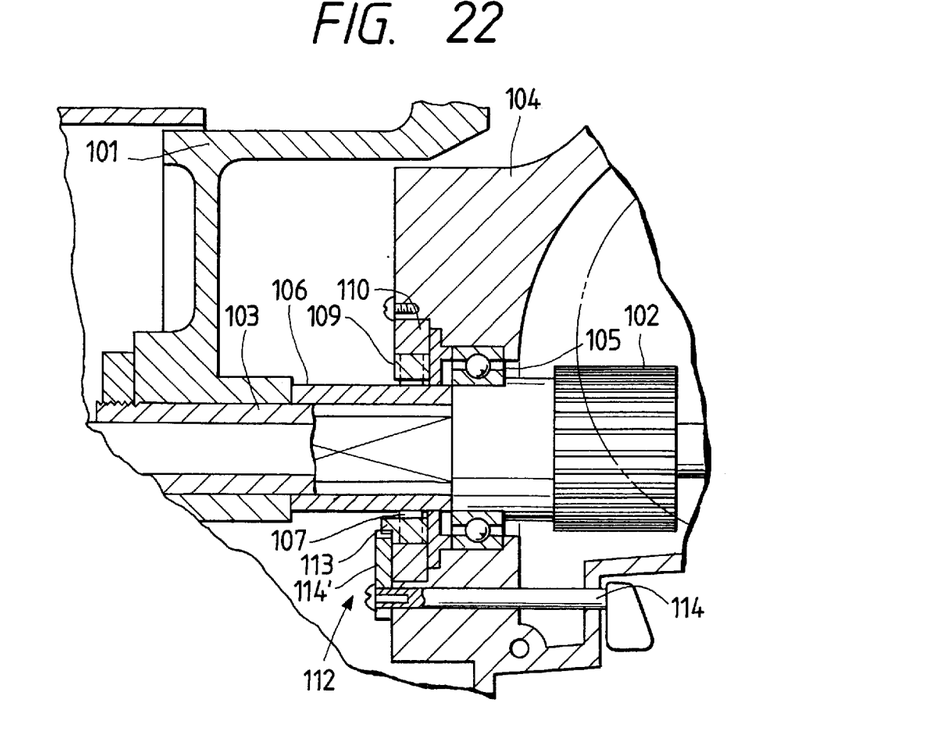
FIG. 22 is a longitudinally sectional front view showing still another modification of the second embodiment.
Figure 23:
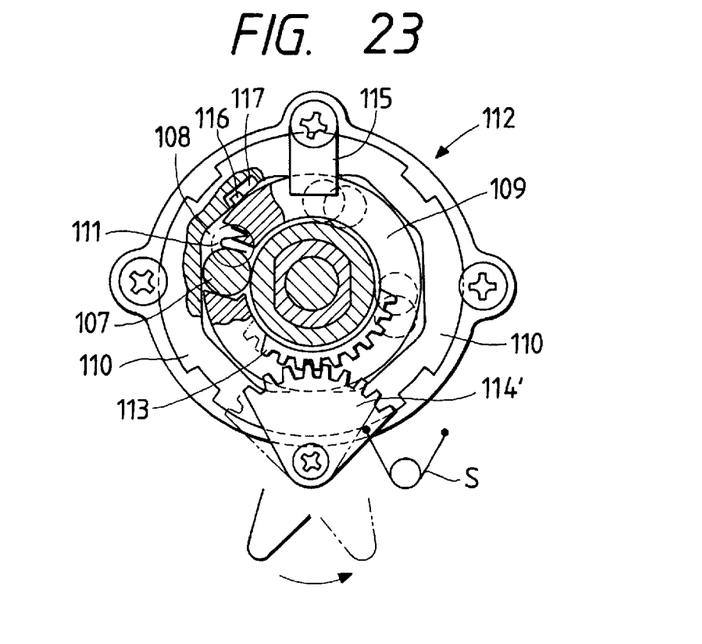
FIG. 23 is a partially cutaway side view of FIG. 22.

FIGS. 22 and 23 show a further modification, in which the annular holder 109 uses a gear-shaped rotation operation member 113, and the operation rod 114 includes a fan-shaped gear 114' meshable with the rotation operation member 113, to rotate the annular holder 109.

As has been described heretofore, according to the second embodiment of the invention, the longitudinal or axial movement of a rolling member capable of performing a wedge action on a rotary member is restricted by an annular holder which receives therein the rolling member, and the outside of the annular holder is rotatably fitted to an annular outer frame for restricting the outward movement of the rolling member, to form a clutch main unit. Further, the annular holder is rotated by a rotation operation member provided thereon to restrict and hold the rolling member at its operative position allowing the wedge action or at its non-operative position prohibiting the wedge action. Therefore, the rolling member, annular hold member, annular outer frame can be combined integrally into one unit, which makes it possible to assemble them in manufacturing and to disconnect for cleaning quickly and easily to thereby improve an operationability, and also makes it possible to stabilize the rolling member supporting operation as well as the wedge action of the rolling member, that is, the rolling member supporting operation and the wedge action of the rolling member can be achieved smoothly and positively. Also, according to the invention, since the position of the rolling member can be switched and restricted to the operative position or to the non-operative position by rotating the annular hold member directly by the rotational operation member, an additional switch member can be dispensed with, which makes it possible to further simplify the unit structure of the reversal preventive device.

What is claimed is:

1. A fishing reel with a reverse rotation preventive device selectively preventing a reverse rotation of a rotary shaft, said fishing reel comprising:
   a fishing reel main body;
   a rotary shaft supported on said fishing reel main body and rotatable in linking with a rotation of a handle;
   an annular outer frame fixedly mounted on a portion of said reel main body located around said rotary shaft;
   at least one rolling member located radially between said rotary shaft and said annular outer frame so that a radially outward displacement of said rolling member is restricted by said annular outer frame;
   an annular holder provided around said rotary shaft and rotatable with respect to said annular outer frame, said annular holder having a first sidewall that is recessed within said annular outer frame and that restricts a displacement of said rolling member in an axial direction of said rolling member;

an operation rod rotatably supported by the fishing reel main body and coupled with said annular holder, wherein rotational operation of said operation rod rotates said annular holder with respect to said annular outer frame to move said rolling member between a first position where said rolling member is permitted to perform a wedge action in cooperation with said rotary shaft and said annular outer frame and wherein said rotary shaft is permitted to rotate in a first direction and prevented from rotating in a second direction opposite from the first direction, and a second position where said rolling member is prevented from performing the wedge action and wherein said rotary shaft is permitted to rotate in both the first and second directions.

2. The fishing reel according to claim 1, wherein: said annular holder has a second sidewall that is recessed within said annular outer frame and that restricts the displacement of said rolling member in another axial direction of said rolling member, said second sidewall being substantially parallel to said first sidewall.

3. The fishing reel according to claim 2, wherein: said annular holder has a third sidewall that is substantially orthogonal to said first sidewall and that restricts a circumferential displacement of said rolling member in at least the second position of said rolling member.

4. The fishing reel according to claim 1, wherein: said annular holder has a second sidewall that is substantially orthogonal to said first sidewall and that restricts a circumferential displacement of said rolling member in at least the second position of said rolling member.

5. The fishing reel according to claim 1, wherein: said first sidewall is provided on an axial side of said rolling member that is proximate to said fishing reel main body.

6. The fishing reel according to claim 1, further comprising:
a least one spring exerting a biasing force biasing said rolling member toward the first position of said rolling member.

7. A fishing reel comprising:
a fishing reel main body;
a rotary shaft supported by said fishing reel main body and rotatable about a rotor axis;
an annular outer frame mounted fixedly with respect to said reel main body and encircling said rotary shaft;
at least one rolling member located radially between said rotary shaft and said annular outer frame, said annular outer frame restricting a radially outward displacement of said rolling member;

an annular holder encircling said rotary shaft and movable with respect to said annular outer frame, said annular holder having a first sidewall that is recessed within said annular outer frame and that restricts an axial displacement of said rolling member;

an operation mechanism including an operation rod supported by said fishing reel main body and rotatable about a rod axis, wherein rotational operation of said operation rod moves said annular holder with respect to said annular outer frame, to thereby move said rolling member between:
a first position where said rolling member performs a wedge action, in cooperation with said rotary shaft and said annular outer frame, that permits said rotary shaft to rotate in a first direction and prevents said rotary shaft from rotating in a second direction opposite from the first direction, and
a second position where said rolling member is prevented from performing the wedge action and wherein said rotary shaft is permitted to rotate in both the first direction and the second direction.

8. The fishing reel according to claim 7, wherein: said annular holder has a second sidewall that is recessed within said annular outer frame and that restricts the displacement of said rolling member in another axial direction of said rolling member, said second sidewall being substantially parallel to said first sidewall.

9. The fishing reel according to claim 8, wherein: said annular holder has a third sidewall that is substantially orthogonal to said first sidewall and that restricts a circumferential displacement of said rolling member in at least the second position of said rolling member.

10. The fishing reel according to claim 7, wherein: said annular holder has a second sidewall that is substantially orthogonal to said first sidewall and that restricts a circumferential displacement of said rolling member in at least the second position of said rolling member.

11. The fishing reel according to claim 7, wherein: said first sidewall is provided on an axial side of said rolling member that is proximate to said fishing reel main body.

12. The fishing reel according to claim 7, further comprising:
a least one spring exerting a biasing force biasing said rolling member toward the first position of said rolling member.

* * * * *